July 8, 1941.   P. G. BIRD   2,248,055
APPARATUS AND METHOD FOR CARRYING OUT CHEMICAL REACTIONS
Filed Dec. 1, 1937   2 Sheets-Sheet 2
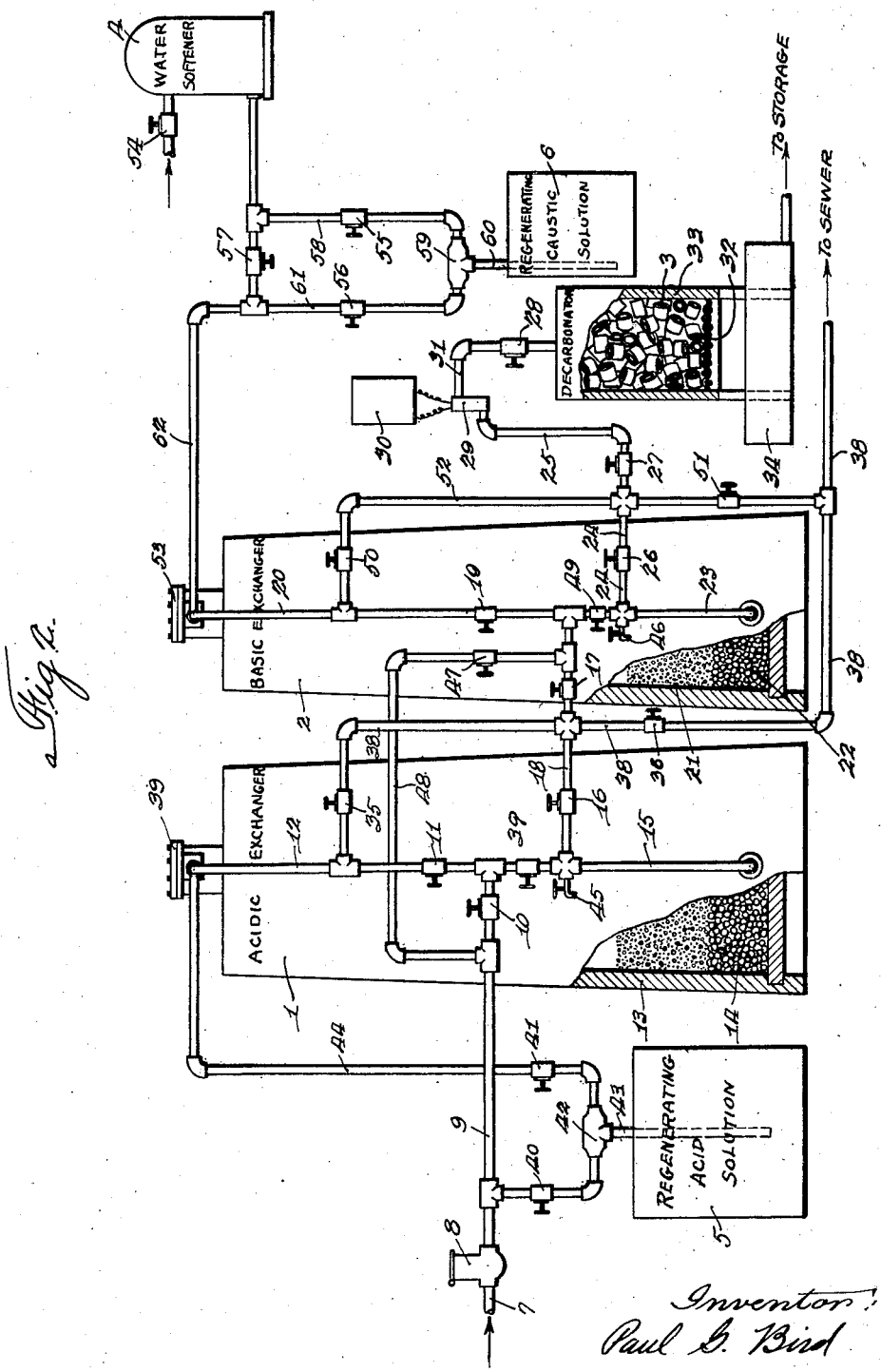

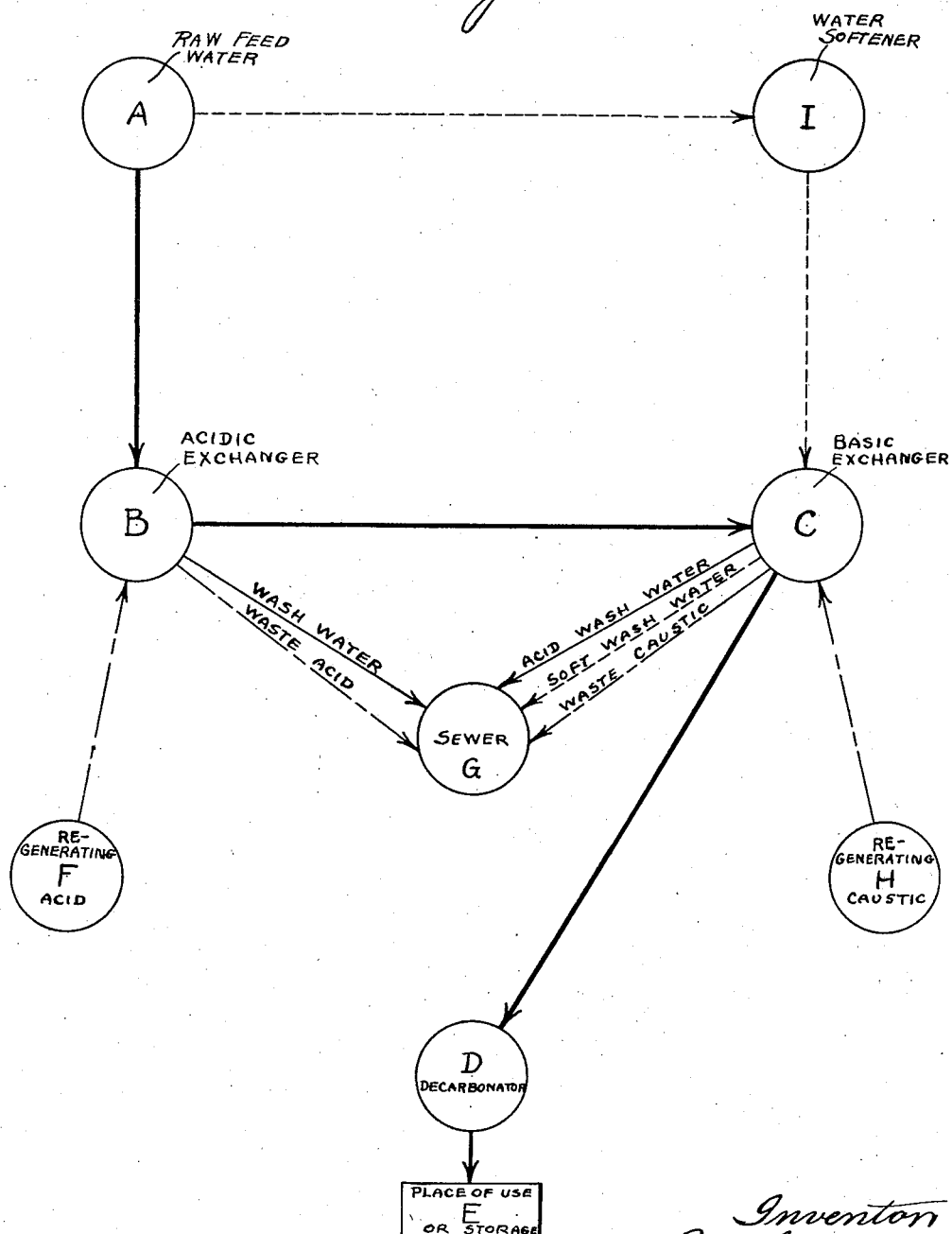

Patented July 8, 1941

2,248,055

UNITED STATES PATENT OFFICE 2,248,055

APPARATUS AND METHOD FOR CARRYING OUT CHEMICAL REACTIONS

Paul G. Bird, Western Springs, Ill.

Application December 1, 1937, Serial No. 177,419

8 Claims. (Cl. 210—24)

The present invention relates to a new and improved method of treating water, and more particularly to a method of removing dissolved electrolytes therefrom.

The principal object of the present invention is to provide a process and apparatus whereby the dissolved electrolytes such as salts, normally present in naturally occurring water, may be substantially completely removed by a process which is simple, efficient, and practically continuous.

A further object is to provide a process and apparatus of the character described, wherein raw water is first treated with a material which removes the positive ions of dissolved salts and converts these salts into acids, and thereafter with material which removes the negative ions and renders the water substantially free of dissolved electrolytes.

A still further object is to provide a method whereby the exhausted materials may be regenerated in an economical and convenient manner.

Other objects will appear as the invention is hereinafter described.

I have found that these and other objects may be attained in accordance with my invention, which comprises, among other things, first passing the raw water through an exchanger, which may conveniently be designated an "acidic exchanger," whereby the positive ions of the salts are removed from solution and replaced by hydrogen ions, thus in effect converting chloride, sulfates, nitrates, etc. to the corresponding acids. The water, after treatment with the acidic exchanger, will have an acidity chemically equivalent to the sum of the chloride, sulfates, nitrates, etc. (but not the carbonates or bicarbonates) as determined with a methyl orange indicator. The water, after treatment with the acidic exchanger, is then treated with a material which may be described as a "basic exchanger," by means of which the acidity of water is removed, and the effluent water is substantially neutral to a methyl orange indicator, and contains only a very small amount of dissolved electrolytes. The effluent water then passes through a decarbonator and thence to the place of use or storage. The exchange materials are regenerated and washed free of regenerating fluid, when suitable tests hereinafter described indicate the partial or complete exhaustion of the exchangers.

In order to disclose the nature of my invention more clearly, reference is made to the accompanying figures of the drawings. It is to be understood, however, that this is done solely by way of illustration and is not to be construed as a limitation upon the spirit and scope of my invention.

Referring to the drawings, Figure 1 is a flow diagram of the preferred method of operation; and Fig. 2 is an elevation, partly in section, of a suitable apparatus for carrying out the process diagrammatically shown in the flow diagram of Fig. 1.

Referring now particularly to the flow sheet of Figure 1, the normal or on-flow period of operation is indicated by the heavy lines; the regeneration phase of the operation, by the dash-dot-dash lines; the preliminary wash operation, by the dotted lines; and the final wash operation by the light lines.

During the normal or on-flow period of operation, raw water A flows successively through the acidic exchanger B, the basic exchanger C, the decarbonator D, and thence to the place of use or storage E. The raw water is passed through the apparatus until the tests described above indicate that either or both exchangers require regeneration.

The regeneration phase of the operation is indicated by the dash-dot-dash lines. To regenerate the acidic exchanger, it is disconnected from the source of raw feed water A and also from the basic exchanger C. The regeneration is accomplished by passing dilute aqueous mineral acid F, such as 1% sulfuric acid, through the exchanger, the waste acid being discharged to the sewer G, until the exchange material has been substantially completely regenerated.

The flow of acid F is then interrupted, and the bed is washed with raw feed water from A, the wash water being passed to the sewer G. When the wash water has an acidity substantially equivalent to the content of nitrates, sulfates, chlorides, etc. (but not the carbonates and bicarbonates) present in the raw feed water as titrated in presence of methyl orange indicator, the effluent is passed to the basic exchanger C. The regeneration of the basic exchanger C is accomplished by disconnecting the same from the acidic exchanger B, and also from the decarbonator D. The regeneration is achieved by passing a dilute aqueous alkali-metal hydroxide such as 1% caustic soda solution H therethrough, the effluent waste caustic being discharged to the sewer G. If the raw water contains much magnesium salts it is preferable to use softened water for diluting the caustic soda. When the basic exchange material has been substantially completely regenerated, the exchanger C is then washed, first with soft water from the water-softening apparatus I, and finally with the normal effluent from the acidic exchanger B, the wash-water in both cases being discharged to the sewer G. When the final wash-water has the desired minimum dissolved solids content, the effluent is passed to the decarbonator D and thence to the place of use or storage E.

Referring now particularly to Figure 2, the preferred apparatus for carrying out the process diagrammatically illustrated in Figure 1, comprises two exchanger tanks 1 and 2, a decarbonator 3, a water softener 4, and the regenerating fluid storage tanks 5 and 6. The interconnecting conduits and the various valves associated therewith will best be understood from a description of the manner in which the process in accordance with my invention may be carried out in this apparatus. In the following description, it is to be understood that all valves are closed unless otherwise indicated by the context.

A. Normal operation

The raw feed water undergoing treatment enters the apparatus through the raw water feed line 7, and the water meter 8. During the normal or on-flow period of operation, the raw feed water flows through the horizontal raw feed line 9, the opened raw feed valve 10, then through the opened up-feed valve 11 and the vertical feed conduit 12, being discharged into the top of the acidic exchanger 1. The water then flows downwardly in the tank through the bed of acidic exchange material 13, and the separating and distributing layer 14 of suitable acid-resisting material such as quartz.

The effluent from the acidic exchanger 1 flows out of the bottom of the tank 1, upwardly through the effluent line 15, thence through the opened transfer valves 16 and 17 in the transfer line 18, and into the top of the basic exchanger 2, through the opened up-feed valve 19, and the vertical transfer line 20. The water flows downwardly in the tank 2, through the bed of basic exchange material 21, and the separating and distributing layer 22 of acid- and caustic-resisting material such as quartz. The effluent water leaves the tank 2 near the bottom through the effluent lines 23, 24, and 25, passing through the opened discharge valves 26 and 27, and thence to the recording unit 29 and 30, which automatically indicates the dissolved solids content of the water passing therethrough. The construction of this unit forms no part of the present invention, and it is not necessary to describe it in detail, since apparatus of this character may be obtained on the market today, the "Nalcometer" sold by the assignee of the present invention being particularly satisfactory.

The water, after passage through the indicating instrument 29, then flows through the line 31 and the opened valve 28 into the top of the open cylindrical tower 3, the base of which is provided with an open mesh grid 32, the tower being loosely filled with Raschig rings 33. The water passes in a condition of high surface exposure, at a slow rate, down through the tower, and is collected in the trough 34 whence it is conducted to the place of use or storage (not shown).

B. Regeneration of the acidic exchanger

After the foregoing normal or on-flow process has been carried out for some time, test samples of the effluent from each exchanger are removed at the try-cocks 45 and 46 on the effluent lines 15 and 23 of the respective exchangers.

In order to ascertain when the acidic exchanger requires regeneration, I prefer to employ chemical tests by titrating a sample of the water removed at the acidic try-cock 45, with an alkali, using methyl orange as an indicator. When it is found by titration that the acidity of the effluent from the acidic exchanger is less than the normal operating acidity calculated on the basis of dissolved solids in the water undergoing treatment, the acidic exchanger may be regenerated. For example, if a treated water containing less than one grain per gallon of dissolved salts is desired, the acidity of the effluent from the acidic exchanger should not be allowed to decrease more than one to two grains per gallon below that calculated on a basis of the dissolved electrolytes other than the carbonates or bicarbonates present in the raw feed water. If more dissolved electrolytes are allowable in the treated water, then the acidity of the effluent from the acidic exchanger may be permitted to drop further.

1. *Backwashing operation.*—When the tests described above indicate that the acidic exchanger requires regeneration, the up-feed valve 11 and the transfer valves 16 and 17 are closed. In order to loosen the layer of exchange material 13 in the tank 1, the bed is "backwashed" by opening the upper dump valve 35, the sewer valve 36, and the down-feed or "back-wash" valve 39. This permits the feed water to flow downwardly through the line 15, thence upwardly in the tank through the beds 14 and 13, and finally out through the upper dump valve 35, the sewer line 38, and the open sewer valve 36 to the sewer. The back-washing operation is continued for a short time only, merely to loosen up the beds 13 and 14.

2. *Regeneration operation.*—At the end of the back-washing period, the raw feed valve 10, the down-feed or back-wash valve 39, and the upper dump valve 35 are closed, and the effluent valve 16 is then opened.

The regeneration is accomplished by passing acid into the acidic exchanger by opening the acid injector valves 40 and 41, which permits the raw feed water to by-pass through the acid injector 42, thereby drawing dilute acid such as dilute aqueous mineral acid, for example, 5% sulfuric acid, from the acid supply tank 5 through the acid leg 43, whereby the acid is diluted to about 1% strength. The acid solution is forced through the acid feed line 44 into the top of the acidic exchanger. The acid flows downwardly through the beds 13 and 14, and out through the lower discharge valve 16 and sewer valve 36.

3. *Washing operation.*—When sufficient acid has passed through the bed 13 substantially completely to regenerate the same, the acid injector valves 40 and 41 are closed.

The raw feed valve 10 and the up-feed valve 11 are then opened, thereby permitting raw feed water to enter the tank as in the normal or on-flow operation, but by-passing the effluent wash water through the sewer valve 36 to the sewer line 38. The wash operation is continued until a test sample taken from the acidic try-cock 45 indicates that the bed 13 is delivering water of the proper acidity, based on its solid content (less the carbonate and bicarbonate content) of the raw feed water undergoing treatment, as described hereinbefore. When the bed 13 is up to normal operating condition, the sewer valve 36 is closed and the transfer valve 17 is opened, in order to deliver the water to the basic exchanger 2.

C. Regeneration of the basic exchanger

In order to determine whether or not the basic exchanger should be regenerated, test samples may be removed from the try-cock 46, and the chloride, sulfate, or nitrate content of the effluent water may be quantitatively determined according to standard methods. I prefer, however, to employ an automatic indicating and recording instrument such as a "Nalcometer" diagrammatically shown as 29 and 30 in Fig. 2. Instruments of this character continuously indicate the total dissolved solid contents of the water passing therethrough, and accordingly are much more convenient than the chemical tests referred to above. Another indication of the failure of the basic exchanger is the presence of mineral acids in the effluent, such as HCl and $H_2SO_4$, etc.

*1. Backwashing operation.*—When any of the foregoing means indicate that the basic exchanger requires regeneration, the normally opened raw water feed valve 10, the transfer valve 17, the up-feed valve 19, and the normal effluent valves 26 and 27 are all closed. The auxiliary raw feed valve 47 on the auxiliary raw feed line 48, the down-feed valve 49, the upper dump valve 50 and the sewer valve 51 are then opened to permit the raw feed water to pass upwardly through the bed of exchanger and out through the dump valve 50, to the sewer lines 52 and 38. The backwashing operation is continued for a short time in order to loosen the basic exchanger beds 20 and 22.

*2. Regeneration operation.*—After the backwashing step is concluded, the auxiliary feed valve 47, the down-feed or back-wash valve 49, and the upper dump valve 50 are closed. The regeneration is accomplished by opening the lower discharge valve 26 and passing caustic solution through the exchanger bed. This is achieved by opening the raw feed valve 54 of the water softener 4, the caustic injector valves 55 and 56, the soft water direct feed valve 57 being closed. The raw feed water then passes through the water-softener 4, and thence downwardly through the caustic injector line 58 to the caustic injector 59. The caustic solution such as dilute aqueous alkali metal hydroxide, for example 5% aqueous caustic soda, in the caustic supply tank 6, is drawn up through the caustic leg 60 and forced through the caustic feed line 61 and 62, where it is diluted to approximately 1%, and into the top of the basic exchanger 2. The caustic soda solution passes downwardly through the bed and flows from the apparatus through the lower discharge valve 26 and sewer valve 51 into the sewer line 38.

*3. Preliminary washing operation.*—When the proper amount of caustic has been passed through the exchanger bed 21, the caustic injector valves 55 and 56 are closed, and the soft water direct feed valve 57 is opened. The soft water from the water-softening tank 4 flows directly into the top of the tank through the feed line 62, passes downwardly through the beds 21 and 22, and out through valve 26 and sewer valve 51 into the sewer line 38. The soft-water wash is continued until the alkalinity of the effluent is approximately equal to the alkalinity of the incoming wash water.

*4. Final washing operation.*—The flow of soft water through the basic exchanger is then stopped by closing the soft water direct feed valves 54 and 57, and the acidulous water from the acidic exchanger is allowed to enter the basic exchanger by opening the raw feed valve 10, the transfer valves 16 and 17, and the up-feed valve 19 on the basic exchanger. The final wash water is discharged through valves 26 and 51 into the sewer line 38, until tests on samples removed at the basic try-cock 46 indicate that the effluent wash water contains the desired minimum of dissolved salts.

To return to the normal or on-flow method of operation, the effluent valves 27 and 28 are opened and the sewer valve 51 is closed. The water then flows through the decarbonator tower 3 as in the normal operation, the rate of flow being regulated by the proper adjustment of the feed and transfer valves.

The operation of the zeolite type of water-softening equipment 4 for the production of soft water will be readily understood by those skilled in the art. When the water-softener 4 is exhausted, it may be regenerated by passing a brine solution therethrough, in the manner well known in the art.

Many exchange materials are available which may be employed in the foregoing process and apparatus. Thus, the water-softener may be charged with any of the well known base-exchange materials, such as zeolites and the like. The materials employed in the acidic and basic exchangers are also well known in the art. In general, any water-insoluble material may be employed in the acidic exchanger provided it has an appreciable capacity for removing the positive ions from aqueous solutions, with the substitution of hydrogen ions therefor. Likewise, any water-insoluble material may be employed in the basic exchanger provided it has an appreciable capacity for removing the negative ions from acid solutions. Various condensation products having a marked capacity for ion removal are known today, and both types of resins are described, for example, by Adams and Holmes in J. Soc. Chem. Ind. 54, 1T to 6T (1935), and also in British Patent 45,309. The process, however, is not limited to any specific resin or combination of resins, and I do not wish to be restricted thereto, for in addition to the Adams and Holmes resins I may employ various condensation products having pronounced ion-removal capacity, such as those described and claimed in the two copending applications of Willard H. Kirkpatrick, Serial Nos. 113,986, and 113,987, both of which were filed on December 3, 1936.

In the foregoing detailed description of my invention, it will be readily apparent to anyone skilled in the art that many variations may be made without departing from the spirit and scope thereof. Thus, for example, open tanks may be employed if desired in lieu of those shown in Figure 2. Furthermore, it is apparent that the two tanks illustrated in the drawings may be constructed in the form of a single tower, provided, for example, with separate compartments to correspond to the individual vessels. It is apparent likewise, that various acid-resisting materials may be employed in lieu of quartz for the layer of separating material beneath the exchange base. Also, it is apparent that the backwashing step may be dispensed with if preferred, or the preliminary and final wash steps may be combined or changed, if desired. Likewise, the direction of flow through the units can be changed. For example, the regenerating solutions could be caused to flow upwardly. This also applies to the wash water, and the water being treated could be caused to flow upwardly. Also, various combinations of up and down flow could be utilized, as for example, regenerate downward, wash upward, and treat downward.

The process and apparatus as illustrated constitute merely the preferred embodiment of the invention, and the one which is used in actual practice. Since, however, many other modifications and equivalents will be apparent to anyone skilled in the art, I intend to be restricted only in accordance with the following patent claims.

I claim:

1. In the process of removing dissolved solids from water by passing raw water successively through an acidic exchanger to remove the positive ions of dissolved salts therefrom, and through a basic exchanger to remove the negative ions therefrom, the method of regenerating said exchangers when the ion-removal capacity thereof falls below a predetermined value, which comprises flushing out the acid exchanger with acid and then with raw water; and flushing out the basic exchanger with aqueous alkali, then with soft water, and lastly with the normal effluent from the acidic exchanger.

2. In the process of removing dissolved solids from water by passing raw water successively through an acidic exchanger to remove the positive ions of dissolved salts therefrom, and thence through a basic exchanger to remove the negative ions therefrom, the method of regenerating said exchangers which includes regenerating said acid exchanger, when the positive ion removal capacity thereof falls below a selected value, by flushing said acidic exchanger with acid and thereafter with raw water; and regenerating said basic exchanger, when the negative ion removal capacity thereof falls below a selected value, by flushing said basic exchanger with aqueous alkali, then with soft water, and thereafter with the normal effluent from said acidic exchanger; the flushing fluids being discharged to waste in the case of each exchanger until the effluent of the regenerated exchanger attains a selected minimum value of dissolved material.

3. In the process of removing dissolved solids from water by passing raw water successively through an acidic exchanger to remove the positive ions of dissolved salts therefrom, and thence through a basic exchanger to remove the negative ions therefrom, the method of regenerating said exchangers which includes regenerating said acidic exchanger, when the positive ion removal capacity thereof falls below a selected value, by flushing said acidic exchanger with acid, and thereafter with raw water; and regenerating said basic exchanger, when the ion removal capacity thereof falls below a selected value, by flushing said basic exchanger with an alkaline material dissolved in soft water and thereafter with the normal effluent of said acidic exchanger; the flushing fluids being discharged to waste in the case of each exchanger until the effluent of the regenerated exchanger attains a selected minimum value of dissolved material.

4. In the process of removing dissolved solids from water by passing raw water successively through the acid exchanger to remove the positive ions of dissolved salts therefrom, thereafter through a basic exchanger to remove the negative ions therefrom, and thence exposing the effluent in a condition of high surface exposure to the free access of air, whereby to remove dissolved gases therefrom, the method of regenerating said exchangers which includes regenerating said acidic exchanger, when the positive ion removal capacity thereof falls below a selected value, by flushing said acidic exchanger with acid, and thereafter with raw water; and regenerating said basic exchanger, when the negative ion removal capacity thereof falls below a selected value, by flushing said basic exchanger with a soft water solution of an alkali, and thereafter with the normal effluent of the acidic exchanger; the flushing fluids being discharged to waste in the case of each exchanger until the effluent of the regenerated exchanger attains a selected minimum value of dissolved material.

5. In the process of removing dissolved solids from water by passing raw water successively through an acidic exchanger to remove the positive ions of dissolved salts therefrom, and thence through a basic exchanger to remove the negative ions therefrom, the method of regenerating said basic exchanger when the negative ion removal capacity thereof falls below a selected value, which comprises treating said basic exchanger with aqueous alkali to restore the negative ion removal capacity thereof, flushing out the excess regenerating fluid from said basic exchanger with soft water, and thereafter washing said basic exchanger with the normal effluent of said acidic exchanger; the regenerating and flushing fluids being discharged to waste and the final flushing operation being continued until the effluent wash water contains a selected minimum value of dissolved electrolyte.

6. The method of claim 5 wherein said aqueous alkali comprises an alkaline material dissolved in soft water.

7. An apparatus for removing dissolved solids from water containing the same, which comprises, in combination, a treating vessel containing a body of exchange material capable of removing positive ions from water containing dissolved salts, a second treating vessel containing a body of material capable of removing negative ions from water containing dissolved acids, conduit means for normally conducting water from the first-named vessel, after passage through the exchange material therein contained, to the second-named vessel for passage through the exchange material therein contained, supply conduit means normally delivering water to be treated to the first-named vessel for passage through the exchange material therein contained, means for periodically interrupting the normal flow of water through said vessels, discharge means for selectively draining each of said vessels to waste, means for periodically introducing a body of regenerating fluid into each of said treating vessels for passage through the exchange material therein contained, means for softening water, and means for periodically conducting soft water from said water softening means to said second-named vessel for flushing the exchange regenerating fluid from the exchange material therein contained and discharging said soft water, after its passage through the last mentioned vessel, to waste; and means for passing treated water from the first named vessel into and through the second named vessel and to waste during the initial period of such passage.

8. An apparatus for removing dissolved solids from water containing the same, which comprises, in combination, a treating vessel containing a body of exchange material capable of removing positive ions from water containing dissolved salts, a second treating vessel containing a body of material capable of removing negative ions from water containing dissolved acids, a tower open at both ends, loosely packed with distributing material, and adapted to permit substantially free circulation of air therethrough, conduit means for normally conducting water from the first-named vessel, after passage through the exchange material therein contained, to the second-named vessel for passage through the exchange material therein contained, supply conduit means normally delivering water to be treated to the first-named vessel for passage through the exchange material therein contained, conduit means for normally conducting the water from the second-named vessel, after passage through the exchange material therein contained, to the upper part of said open tower, means for periodically interrupting the normal flow of water through said vessels, discharge means for selectively draining each of said vessels to waste, means for periodically introducing a body of regenerating fluid into each of said treating vessels for passage through the exchange material therein contained, means for softening water, and means for periodically conducting soft water from said water softening means to said second-named vessel for flushing the excess regenerating fluid from the exchange material therein contained and discharging said soft water, after its passage through the last mentioned vessel, to waste; and means for passing treated water from the first named vessel into and through the second named vessel and to waste during the initial period of such passage.

PAUL G. BIRD.